(12) United States Patent
Davari et al.

(10) Patent No.: US 9,585,037 B1
(45) Date of Patent: Feb. 28, 2017

(54) EVALUATING THE PERFORMANCE OF A COMMUNICATION NETWORK USING A MOBILE DEVICE APPLICATION

(71) Applicant: SOLUTELIA LLC., Aurora, CO (US)

(72) Inventors: Mohssen Davari, Denver, CO (US); Youn-Jung Han, Seoul (KR); Myung-Chul Kim, Gwangju-si (KR)

(73) Assignee: Solutelia, LLC, Aurora, CO (US)

( * ) Notice: Subject to any disclaimer, the term of this patent is extended or adjusted under 35 U.S.C. 154(b) by 162 days.

(21) Appl. No.: 14/175,932

(22) Filed: Feb. 7, 2014

(51) Int. Cl.
*G06F 15/173* (2006.01)
*H04W 24/08* (2009.01)

(52) U.S. Cl.
CPC ................... *H04W 24/08* (2013.01)

(58) Field of Classification Search
CPC ................................. H04W 24/08
See application file for complete search history.

(56) References Cited

U.S. PATENT DOCUMENTS

| | | | | |
|---|---|---|---|---|
| 9,092,615 B1* | 7/2015 | Mao | ......... | G06F 21/51 |
| 2008/0092128 A1* | 4/2008 | Corry | ......... | G06F 11/3664 717/158 |
| 2009/0124250 A1* | 5/2009 | Topaltzas | ......... | H04W 24/06 455/423 |
| 2009/0227251 A1* | 9/2009 | Lei | ......... | H04J 11/0069 455/425 |
| 2012/0054875 A1* | 3/2012 | Antill | ......... | G06F 21/10 726/28 |
| 2012/0069748 A1* | 3/2012 | Van Den Bogaert | . | H04W 24/10 370/252 |
| 2013/0124714 A1* | 5/2013 | Bednar | ......... | G06F 9/45558 709/224 |
| 2013/0279354 A1* | 10/2013 | Ekman | ......... | H04W 24/00 370/252 |

* cited by examiner

*Primary Examiner* — Umar Cheema
*Assistant Examiner* — Tesfu Mekonen
(74) *Attorney, Agent, or Firm* — NovoTechIP International PLLC (57) ABSTRACT

A mobile communication device is configured to evaluate the performance of a mobile wireless communication network. The device is configured for communication across the mobile wireless communication network, and executes a network evaluation application operative to measure a quality of communication services provided by the mobile wireless communication network. The network evaluation application retrieves communication parameters relating to communications of the mobile communication device across the mobile wireless communication network, and measures a throughput of communication packets transmitted or received by the network evaluation application across the mobile wireless communication network. In turn, the network evaluation application displays, on a display screen of the mobile communication device, the communication parameters retrieved from the debugging utility of the operating system and the measured throughput of communication packets across the mobile wireless communication network.

22 Claims, 8 Drawing Sheets

EVALUATING THE PERFORMANCE OF A COMMUNICATION NETWORK USING A MOBILE DEVICE APPLICATION

TECHNICAL FIELD

The present subject matter relates to techniques and equipment for evaluating the performance of a mobile communication network using an application executing on a mobile communication device without requiring root access to the mobile communication device.

BACKGROUND

Mobile wireless communication networks enable mobile subscribers to make and receive telephone calls, and to transmit and receive data using mobile communications devices such as cellular phones and smartphones. When a mobile communication device is used in the vicinity of a base station and a clear communication link is available between the mobile device and the base station, the mobile device may be provided with high reliability and high quality mobile communication services. However, when many mobile communications devices are crowded in the vicinity of a base station, or when a mobile device is located in a radio shadow area of the base station, communications between mobile devices and base stations may suffer from slow and/or unreliable service.

To provide high quality mobile communication services, mobile wireless communication network operators monitor the performance of their networks throughout coverage areas of the networks. The performance information can, in turn, be used to update a configuration of a piece of currently installed network equipment to provide enhanced communication services. The performance information can, additionally or alternatively, be used to identify locations for installing additional base stations, repeaters, or other network equipment.

In general, the performance information is obtained through measurement of the quality of the wireless communication network service at various locations, times, and/or under different environmental or usage conditions. The measurements are generally undertaken by highly trained persons having received education related to the measurement of the quality of wireless communications networks and using specialized devices intended for use by such experts. As a result, mobile network operators incur significant expense to obtain such measurements.

A need therefore exists for more versatile systems and methods for measuring the quality of a wireless communication network.

SUMMARY

According to an aspect of the present application, a method and a mobile communication device are provided for evaluating the performance of a mobile wireless communication network. A network evaluation application is executed in the mobile communication device, wherein the mobile communication device is configured for communication across the mobile wireless communication network and the network evaluation application is operative to measure a quality of communication services provided by the mobile wireless communication network. The network evaluation application retrieves, from a debugging utility of an operating system of the mobile communication device, communication parameters relating to communications of the mobile communication device across the mobile wireless communication network. The network evaluation application further measures a throughput of communication packets transmitted or received by the network evaluation application across the mobile wireless communication network. The communication parameters retrieved from the debugging utility of the operating system and the measured throughput of communication packets across the mobile wireless communication network are then displayed on a display screen of the mobile communication device.

In some examples, the mobile communication device is a non-rooted mobile communication device, and the debugging utility of the operating system is accessible to non-root users of the mobile communication device.

In some examples, the debugging utility of the operating system of the mobile communication device is a utility created for use by developers of user applications executing on the operating system. Alternatively or additionally, the debugging utility of the operating system of the mobile communication device is a utility that is not created for routine use by user applications executing on the mobile communication device.

In some examples, the network evaluation application transmits the communication parameters retrieved from the debugging utility and the measured throughput of communication packets for display to remote users across the mobile wireless communication network to a computer remote from the mobile communication device. The communication parameters and the measured throughput may be transmitted to the remote computer in real-time as the parameters are retrieved from the debugging utility of the operating system and the throughput of communication packets is measured by the network evaluation application.

In some examples, a request to perform a mobile communication network evaluation on the mobile communication device is received in the network evaluation application from a user. In response to receiving the request, an evaluation is performed by the network evaluation application by initiating, on the mobile communication device, one or more communications across the mobile wireless communication network according to test parameters included in the request. The measuring the throughput of communication packets may then include measuring the throughput of communication packets transmitted by or received by the network evaluation application across the mobile wireless communication network while the one or more communications are performed across the mobile wireless communication network according to the test parameters. In some examples, the request to perform a mobile communication network evaluation on the mobile communication device is received via the mobile communication network from a computer remote from the mobile communication device, and the one or more communications are initiated according to test parameters received from the remote computer. In some examples, the network evaluation application transmits, in real-time during the performing of the evaluation to the computer remote from the mobile communication device, the communication parameters retrieved from the debugging utility and the measured throughput of communication packets for display to remote users. In some examples, the request received from the remote computer includes the test parameters, and the test parameters include parameters for establishing a voice call, performing a file transfer protocol (FTP) transfer, performing a ping operation, or transmitting a hypertext markup language (HTML) request.

In some examples, the network evaluation application displays on the display screen of the mobile communication device a map having overlayed thereon communication parameters or throughput measurements obtained by the network evaluation application at a plurality of different locations.

In some examples, the mobile communication device is a smartphone running an Android operating system.

These general and specific aspects may be implemented using a system, a method, or a computer program, or any combination of systems, methods, and computer programs. Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to evaluating the performance of a mobile wireless communication network using an application executing on a mobile communication device. The application may not require root access to the mobile communication device for proper functioning.

In accordance with the disclosure, a network evaluation application executes on a processor of a mobile communication device such as a smartphone. The network evaluation application retrieves, from a debugging utility of the operating system of the mobile communication device, communication parameters relating to communications of the device across the mobile wireless communication network. The debugging utility is a utility that is accessible to non-root users of the mobile communication device, and that is intended for use by developers of user applications executing on the operating system. The debugging utility is generally not intended for routine use by user applications executing on the mobile communication device. In addition to retrieving the communication parameters, the network evaluation application measures a throughput of a communication link of the mobile communication device across the mobile wireless communication network based on communication packets transmitted or received by the application across the network. The applicant can then provide a display screen showing the retrieved communication parameters and measured throughput for use by a user of the mobile communication device.

In some examples, the network evaluation application is prevented from directly accessing a chipset of the mobile communication device in a non-rooted device, and is thus prevented from obtaining the certain wireless communication information directly from the chipset. The network evaluation application thus evaluates the performance of the mobile communication network based on measurement data provided by the debugging utility of the operating system of the mobile communication device.

In certain cases, the network evaluation application interfaces with a server and/or console remote from the mobile communication device. The application can transmit to the remote server or console the communication parameters and measured throughput in real-time, and can receive from the remote server or console requests to perform evaluations. The requests may include test parameters according to which the application initiates communications across the mobile wireless communication network. The application then obtains updated or current communication parameters from the debugging utility, and/or measures the throughput of the network, while the communications initiated according to the test parameters are performed.

Reference now is made in detail to the examples illustrated in the accompanying drawings and discussed below.

Figure 1:
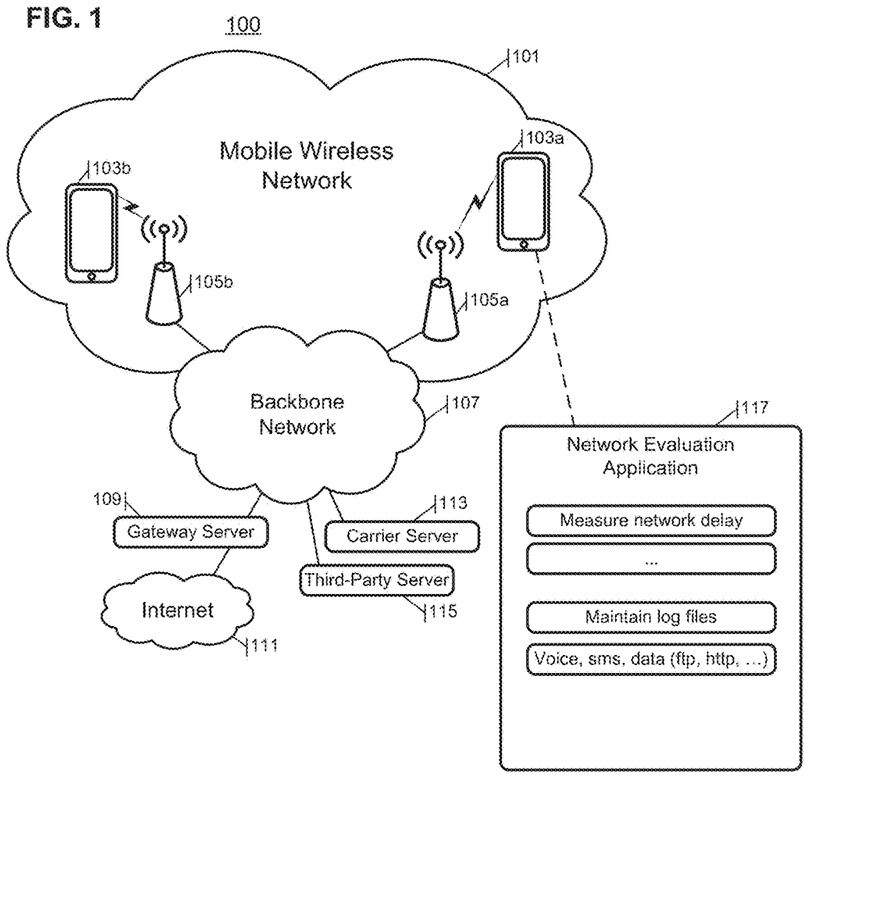
FIG. 1 is a high-level functional block diagram schematically illustrating a mobile wireless communication network system including a mobile communication device executing an application for evaluating the performance of a mobile communication network.

FIG. 1 schematically illustrates a mobile wireless communication network system 100 including a mobile wireless communication network 101. The mobile wireless network 101 provides mobile communication services, including voice and/or data services, to a plurality of mobile communication devices 103a, 103b of subscribers. Although the system 100 is illustratively shown as including a single mobile wireless network 101, the system 100 may generally include multiple mobile wireless communication networks that are operated by the same or different communication service providers (e.g., carriers) and provide mobile communication services within overlapping and/or distinct coverage areas. Each mobile communication device 103a, 103b may be configured to operate on a single network 101 or on a single carrier's network(s), or alternatively the devices 103a, 103b can be configured to operate on multiple different mobile wireless communication networks.

The mobile wireless communication network 101 is shown as including two base stations 105a, 105b for purposes of illustration, although the network 101 will generally include many more base stations. Each base station 105a, 105b provides mobile communication services to mobile communication devices 103a, 103b located within its vicinity. Coverage areas of adjacent base stations 105a, 105b may overlap with one another, or may be spaced apart from each other. A mobile communication device 103a, 103b may, in some locations and situations, be able to receive mobile communication services from two or more base stations 105a, 105b within its vicinity. In other locations and/or situations, the mobile communication device 103a, 103b may receive mobile communication service from only a single base station, or may not receive mobile communication service from any base station.

The base stations 105a, 105b are generally connected to each other through wired communication links and a backbone network 107. The connection to the backbone network enables a mobile device 103a connected to a first base station 105a to communicate via the first base station 105a with a mobile device 103b connected to another base station 105b via the backbone network 107. The wired communication links may take the form of network backhaul links, Ethernet links (e.g., via a cable modem or DSL line), or the like. In some examples, a base station 105a, 105b may connect through a wireless communication link to the backbone network 107. The wireless communication link may be a mobile wireless communication link (e.g., in the case of a mobile wireless repeater), a WiFi link (e.g., in the case of a low-power access node), or the like.

The backbone network 107 may further be connected to other networks and/or servers, and may enable the mobile device 103a to access mobile communication network services including data services and Internet-based services via the backbone network 107. As shown in FIG. 1, the backbone network 107 may be connected through gateway server 109 to the Internet 111 to provide mobile web browsing and other Internet-based services to mobile communication devices 103a, 103b. The backbone network 107 may further be connected either directly, via the Internet 111, or via another network (e.g., a private network or a local area network (LAN)) to carrier servers 113 and/or third-party servers 115 that provide value-added services to users of the mobile communication devices 103a, 103b.

The base stations 105a, 105b may correspond to an eNodeBs or other types of high-powered base stations each providing communication services within a relatively large coverage area such as a macro cell. Some of the base stations 105a, 105b may correspond to low-power access nodes providing communication services to smaller coverage areas referred to as small cells, pico cells, femto cells, micro cells, or the like. Each base station 105a, 105b can include communication circuitry as well as one or more antennas used for establishing and communicating across wireless communication links with mobile communication devices 103a, 103b.

Each base station 105a, 105b provides mobile wireless communication services to mobile communication devices 103a, 103b located within a cell coverage area of the base station 105a, 105b. While a cell coverage area is often illustratively shown as a circular area surrounding a respective base station 105a, 105b, the cell coverage area more generally has a complex shape influenced by local topography, environmental conditions, as well as buildings, walls, and other obstacles that limit the propagation of radio waves between the base station 105a, 105b and mobile devices 103a, 103b. In particular, cell coverage areas often include holes or gaps, sometimes referred to as radio shadow areas, in which no communication services are available or in which only unreliable or low quality communication services are available.

The quality of communication services within a cell coverage area may vary between different locations in the coverage area, and/or at different times in a same location in the coverage area. In general, however, communication services of reasonable quality are available from an associated base station 105a, 105b within a cell coverage area of the respective base station. No communication services, or unreliable or low quality communication services, are generally available from a base station 105a, 105b outside of the corresponding cell coverage area of the base station.

In order to improve the mobile communication services provided by a mobile wireless network operator, the network operator may measure the quality of mobile communication services provided by the network 101. The measurement may be performed on a sporadic basis to evaluate the mobile communication services at particular times and/or locations, or on a periodic or continuous basis to monitor the quality of mobile communication services on a regular basis.

In some situations, the measurements are performed by highly trained persons having received education related to the measurement of the quality of wireless communications networks and using specialized devices intended for use by such experts. For example, the measurements can be performed using a laptop computer connected to mobile wireless communication circuitry, such as an air-card, a mobile wireless modem, a tether to a mobile communication device, or the like. Such specialized devices are generally expensive and require significant expertise to operate.

Alternatively, a mobile communication device 103a such as a smartphone can be configured to provide measurements of mobile communication services provided by the network 101. To this end the mobile communication device 103a may execute a network evaluation application 117 that is operative to measure the quality of mobile communication network services provided by the network 101 to the mobile device 103a at the current location of the device 103a. Further details regarding the network evaluation application 117, including the measurements performed and functionalities provided by the application 117, are described in further detail below.

The network evaluation application 117 is operative to measure a number of different performance characteristics of the mobile communication network 101 on which it is currently communicating, and/or of other communication network on which it is operative to communicate. For example, the application 117 is operative to measure a received signal strength, as well as noise and interference on channels used by the network. The application 117 can further be operative to measure error rates, retransmit rates, and other parameters indicative of signal quality. The application 117 can additionally measure the throughput or speed of transmissions across the network 101, both for uplink and downlink communications and for different types of data (e.g., voice, streaming data, asynchronous data, or the like).

FIGS. 2A-2H are illustrative screenshots of the network evaluation application 117 executed on a mobile communication device 103. In particular, the screenshots show various display screens generated by the network evaluation application 117, and showing communication parameters obtained or measured by the application 117 during network evaluation and monitoring.

Figure 2A:
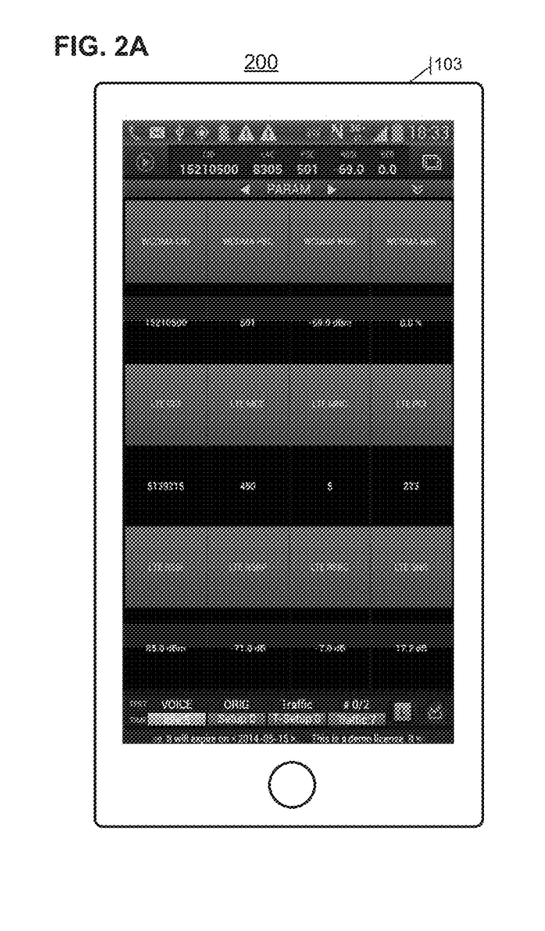
FIGS. 2A-2H are screenshots illustrating the operation of the network evaluation application executed on the mobile communication device of FIG. 1.

As shown in screenshot 200 of FIG. 2A, the network evaluation application 117 is operative to measure and/or obtain wireless network communication parameters for multiple network technologies, including but not limited to networks or network equipment operating in accordance with CDMA (code division multiple access), WCDMA (wideband CDMA), LTE (long term evolution), UMTS (universal mobile telecommunication systems), GPRS (general packet radio service), GSM (global system for mobile communications), and/or EVDO (enhanced voice-data optimized) communication technologies.

In general, when the mobile communication device 103 is operating in an idle mode, the application 117 may obtain general communication parameters for multiple different network technologies concurrently or substantially concurrently. For example, when operating in the idle mode, the application 117 may monitor received signal strength associated with each of the technologies of the network 101. During active mode operation, the application 117 is generally operative to measure or perform testing and evaluation relative to only a single network technology, although in some examples the application 117 may be configured to measure or perform testing and evaluation relating to two or more network technologies in the active mode.

As shown in screenshot 200, the application 117 provides current network communication parameters relating to both WCDMA and LTE technologies. In particular, the application 117 provides a cell ID (CID) received by the device 103 from the network 101 and indicative of a base station or cell tower from which mobile communication services are currently being provided to the device 103; a location area code (LAC) received by the device 103 from the network 101 and indicative of a current location of the device 103; a primary scrambling code (PSC) received by the device 103 from the network 101 and indicative of an antenna or node-B sector that the device 103 is associated with; a received signal strength indicator (RSSI) indicative of a total received wideband power (including all interference and thermal noise); and a bit error rate (BER) of data packets communicated between the device 103 and the network 101. These values can be reported both for communications according to the WCDMA and/or LTE communication technologies, among others.

In addition, the application 117 may obtain and report a mobile country code (MCC) and/or a mobile network node (MNC) received by the device 103 from the network 101 and indicative of the carrier or operator of the network 101 to which the device 103 is connected; a physical layer cell identity (PCI) (e.g., in an LTE network) received by the device 103 from the network 101 and associated with the network cell the device 103 is currently connected to and communicating through; a reference signal received power (RSRP) (e.g., in an LTE network) calculated by the device 103 based on communications received through the network 101 and indicative of a linear average over the power contributions of the resource elements that carry cell-specific reference signals within the considered measurement frequency bandwidth; a reference signal received quality (RSRQ) (e.g., in an LTE network) calculated by the device 103 based on communications received through the network 101 and calculated as a Ratio N×RSRP/(E-UTRA carrier RSSI), where N is the number of Resource Blocks of the E-UTRA carrier RSSI measurement bandwidth; a signal to noise ratio (SNR) or signal to interference plus noise ratio (SINR); or the like. Some of the various parameters obtained and reported by the application 117 are obtained directly from an operating system, chipset, processor, or transceiver of the mobile communication device 103. For example, some or all of the communication parameters can be obtained by the application 117 from a debugging utility of the operating system executing on the mobile communication device 103. Some of the various parameters are calculated by the application 117 based on measurement data obtained from the operating system, chipset, processor, or transceiver. For example, the application 117 may measure a throughput, delay, and/or latency of communication packets transmitted or received by the application 117 across the mobile wireless communication network 101, and report the measured throughput, delay, and/or latency in a display screen of the device 103.

Figure 2B:
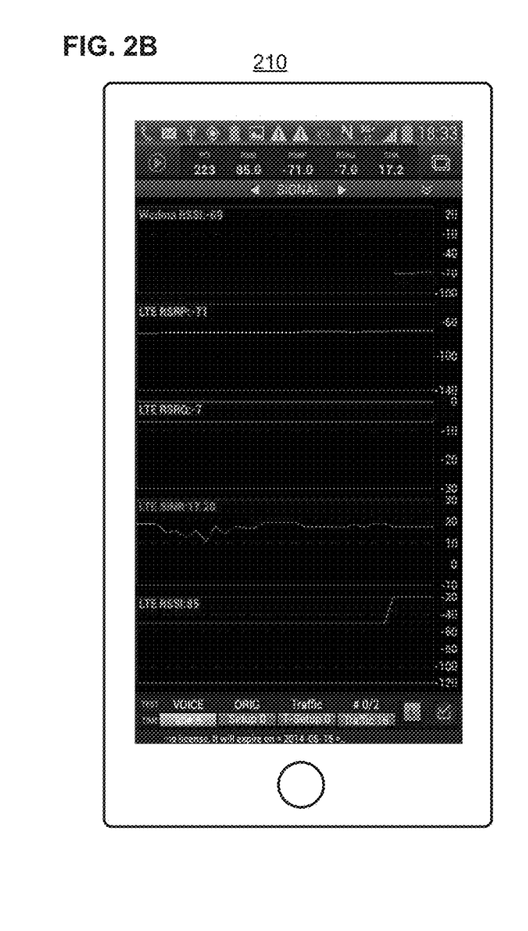

In addition to the various communication parameters and network performance measurements displayed by the application 117 in a table shown in screenshot 200, the network evaluation application 117 is operative to display signal parameter measurements obtained over a period time as a graph or plot. In this respect, screenshot 210 of FIG. 2B shows a display screen of the application 117 showing several of the signal parameter measurements plotted as a function of time (along the horizontal x-axis) for consultation by a user of the device 103. The signal parameters may be measured and plotted in real-time, such that the plots show the parameter measurement values for a current time and a time period immediately preceding the current time. Alternatively or additionally, the plots can show the parameter values obtained during an earlier time period based on parameter measurements that were obtained during the earlier time period and were stored in a memory of the mobile device 103. While the parameter measurements shown in the plots of screenshot 200 are plotted relative to time (along the x-axis), the application 117 may enable a user to select both the x-axis and y-axis variables to be shown in each plot. As such, a user can for example select to plot a parameter measurement value (e.g., RSSI, plotted along the y-axis) relative to a distance from a base station (on the x-axis), SNR (on the x-axis), or the like.

Figure 2C:
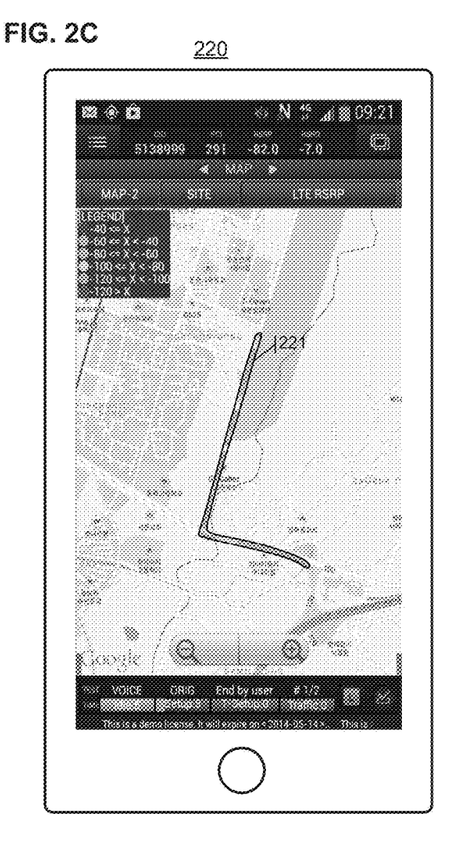
Figure 2D:
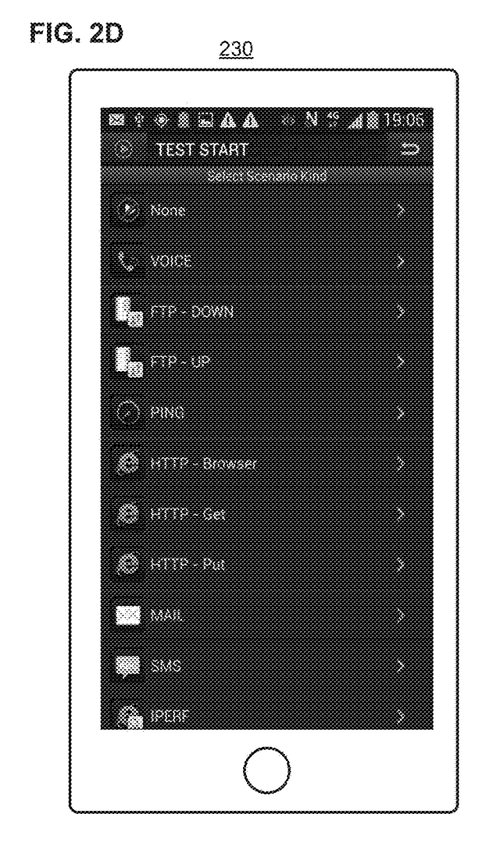
Figure 2E:
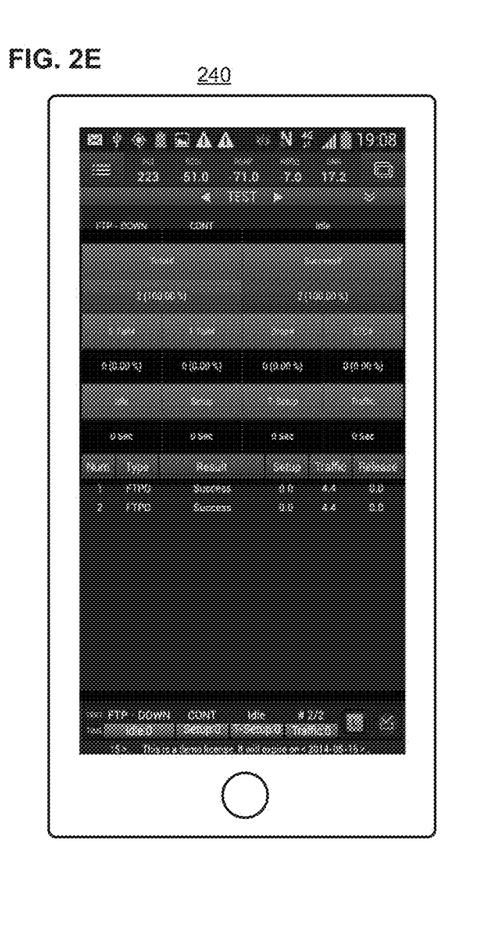

The application 117 can further be configured to display network communication parameters and network performance measurements on a map. Screenshot 220 of FIG. 2C shows an illustrative map result view. In the map-view, the application 117 displays network performance measurement results as a color-coded (or gray-scale) trace 221. The trace 221 shows the locations at which the mobile device 103 made measurements of a currently displayed parameter, while the color (or gray intensity) of each portion of the trace indicates the value of the displayed parameter at the location. For example, in the example shown in screenshot 220, measurements of an LTE RSRP parameter (in decibels dB) are shown along the trace 221 with the gray intensity of each point along the trace being indicative of a measurement according to the legend displayed on the screen. The map-view may provide real-time information, for example by extending the trace 221 in real-time as the mobile device moves and obtains new parameter measurement values. The map-view may also be used to view previously recorded measurement values.

The application 117 can monitor network performance by obtaining and recording communication parameters and network performance measurement values associated with signals received by the device 103 from the network 101. In some examples, the network evaluation application 117 can additionally run one or more evaluations or tests on the network 101. The running of an evaluation or test can include the application 117 initiating one or more communication operations across the network 101 and measuring the network's communication performance while the communication operations are performed. A test can include one or more of establishing and supporting a voice call, performing a file transfer protocol (FTP) transfer, performing a ping operation, transmitting a hypertext markup language (HTML) request and receiving a related response, or the like. In some examples, the test can be based on a script for performing multiple operations, either concurrently or sequentially (e.g., performing a voice call and a concurrent FTP transfer). During the test, the application 117 monitors the performance of the network, and stores a detailed log file of communication parameters and network performance measurements obtained during the test. The application 117 can also report the communication parameters and performance measurements, and/or the contents of the stored log file, in real-time or once the test is finished. The application can report the parameters and measurements to a user of the mobile device 103 (e.g., by providing information for display on a screen of the mobile device), to a remote server, or to a user of a console remote from the device 103 (e.g., an Internet-connected console executing a network evaluation console application compatible with the application 117).

A user of the mobile device 103 can initiate the test through the network evaluation application 117 by selecting a "test" menu option. Upon receiving selection of the "test" menu option, the application 117 prompts the user for the type(s) of test(s) to run. For example, the user may be presented with screenshot 230 of FIG. 2D to select one or more scenarios to include as part of the test. Each scenario can include a voice call, an FTP download (e.g., a file transfer from a remote FTP server to the device 103) or an FTP upload (from the device 103 to a remote FTP server), a ping operation, an HTTP browser-generated request, an HTTP get or put request, sending and/or receiving of an e-mail message, sending and/or receiving of a short message service (SMS) message, sending and/or receiving of a media stream, throughput testing (e.g., using an IPERF utility) of a stream according to the transmission control protocol (TCP) or user datagram protocol (UDP), or the like. The user may further select the order in which to run the test(s), including selection of whether multiple tests should be performed sequentially or concurrently. The user additionally selects test parameters for each of the test(s) (e.g., a length of a voice call; a file size or a particular file to use for an FTP transfer; identification of a source or destination server for an FTP transfer, a ping, or an HTTP related test; a content of a HTML request; . . . ), and the like. The user may further select test parameters determining whether the test (or sequence of multiple tests) should be initiated at a current time (e.g., now), at a scheduled later time, or on a recurring basis (e.g., on a periodic basis, or an aperiodic or randomized basis). Once all test parameters have been selected, the user can select a Test Start option in order to cause the test(s) to be performed. In some examples, the application 117 is not limited to perform network measurements from the mobile device 103 on which the application 117 is executing. Instead, the application may prompt a user to identify a mobile device on which the test(s) should be performed. The device executing the application 117 may be selected by default as the device on which the tests should be performed, although the user may use the application 117 to schedule a test to run on another mobile communication device if appropriate.

In some examples, a user of a console remote from the mobile device 103 can initiate a test by selecting a "test" menu option in a network evaluation console application executing on the console. In this respect, the console application may provide an interface substantially similar to the interface of application 117 and described in FIGS. 2A-2H. The console application may additionally enable a user of the console to select one or more mobile devices executing the network evaluation application 117 on which the test(s) should be performed. In response to a user selection a Test Start option on the console application, the test parameters selected by the user through the console application are communicated to and stored on the selected mobile communication device 103 to enable the device 103 to perform the selected test(s).

The user, either through the user interface of the application 117 on the mobile device 103 or through the user interface of the console application, may view a listing of tests currently running on the mobile device 103, scheduled for future execution on the mobile device 103, and/or previously completed on the mobile device 103. The user can select any test in the listing in order to view test parameters, to edit test parameters (e.g., in the case scheduled tests), or to view test measurement results (e.g., in the case of currently running or previously completed tests). If a test is currently executing on the device 103, the user can further select an option to be presented with test results and measurements in real time on the mobile device 103 and/or on the remote console.

Screenshots 240-270 of FIGS. 2E-2H show display screens generated by the application 117 during and/or following the performing of a test. In screenshot 240 of FIG. 2E, the results of a test involving an FTP download operation are shown in a table format; in screenshot 250 of FIG. 2F, the results of the test involved the FTP download are plotted as a graph showing time along the x-axis; in screenshot 260 of FIG. 2G, detailed log file information relating to a ping test are displayed; and in screenshot 270 of FIG. 2H, results from a browser-based HTTP request test are provided for the user's review.

Figure 2F:
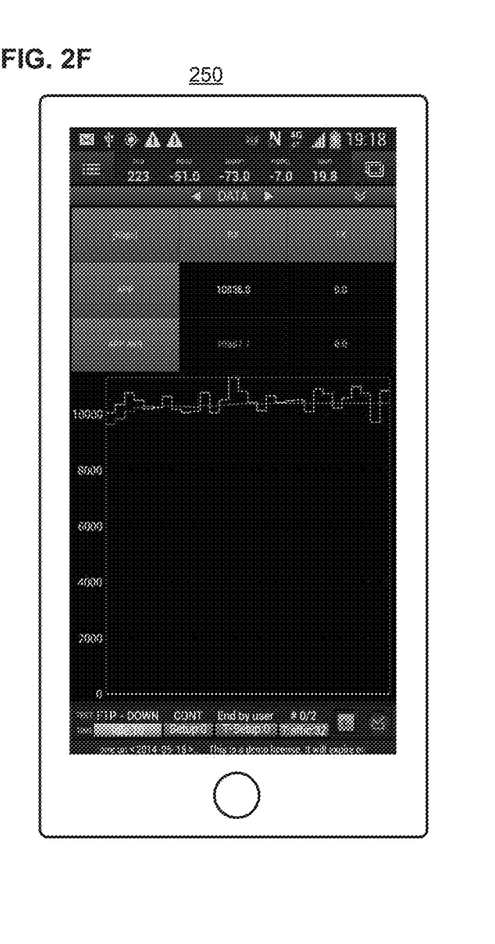
Figure 2G:
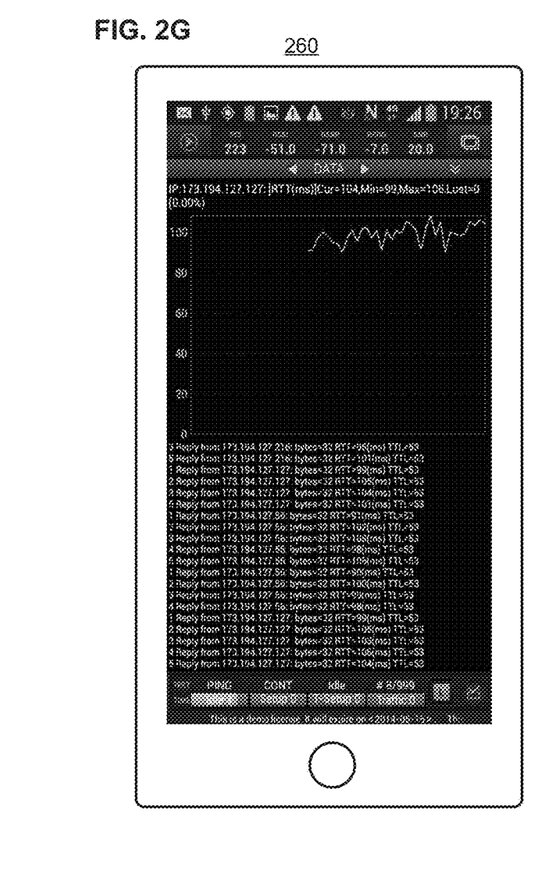
Figure 2H:
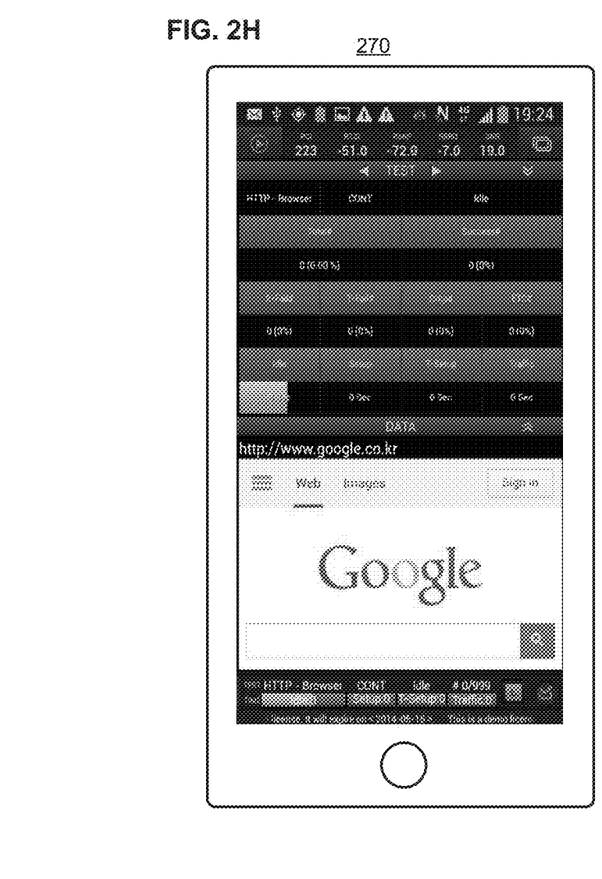

As shown in screenshot 250 of FIG. 2F, for example, the network evaluation application 117 measures the download throughput (i.e., receive (Rx) throughput) in kilobits per second (Kbps) while the test is performed. The application could alternatively or additionally measure the upload throughput (i.e., transmit (Tx) throughput) while the test is performed, and/or the packet delay and latency while the test is performed. The application 117 measures the throughput based on the packets received or transmitted by the network evaluation application 117 while the test is being performed, and more specifically based on the rate, delay, and latency with which the application 117 is able to receive or transmit the packets across the mobile wireless communication network 101.

In addition to the various mobile communication parameters and network performance measurements described above as being obtained and/or measured by the network evaluation application 117, the application 117 may additionally be operative to obtain a received signal code power (RSCP) (e.g., in UMTS networks) which is based on a received power level of a pilot channel of a cell and can be used as an indication of signal strength, as a handover criterion, in downlink power control, and to calculate path loss; a ratio Ec/No of received energy per chip (Ec) of a pilot channel to a total noise power density (No), which can be used like RSCP to compare different cells for handover/cell reselection criteria; a latency or delay between a signal or information originating at the transmitting end and when it is received at the other end; an uplink (UL) and/or downlink (DL) throughput used to evaluate an amount of user data transmitted or received per second (e.g., in bits per second, or bps); a ratio Ec/Io of Ec to total interference (Io); and/or a secondary scrambling code (SSC) (e.g., in UMTS networks) that can be employed by the secondary synchronization channels while transmitting channels that do not need to be received by everyone in the cell. The application 117 may additionally be operative to obtain a system identification number (SID) or a network identification number (NID) indicative of a mobile wireless network; and/or a base station identification number (BID) indicative of a base station of the mobile wireless network.

The network evaluation application 117 may further obtain location information (e.g., GPS coordinates, triangulation-based location information, or the like) to associate with each test and/or measurement of mobile communication parameters. The network evaluation application 117 can additionally obtain temperature information (e.g., via a temperature sensor of the device 103), one or more pictures (e.g., via a camera of the device 103), and/or other data to associate with each test and/or measurement of communication parameters performed on the device 103.

The network evaluation application 117 is an application that is installed on and executes on the mobile communication device 103. The application 117 obtains the network performance parameters, including the various communication parameters and network performance data described herein, from various systems of the device 103. For example, the application 117 can obtain communication parameters and measurement data from a transceiver of the device 103, from a chipset, processor, or memory of the device 103, from an operating system executing on the device 103, or the like. The particular systems from which the application 117 obtains the communication parameter measurements and data may depend on a configuration of the device 103, and/or on a configuration of the application 117. In particular, the particular systems from which the communication parameter measurements and data are obtained may depend on whether the mobile communication device 103 is a rooted or a non-rooted device.

Figure 3A:
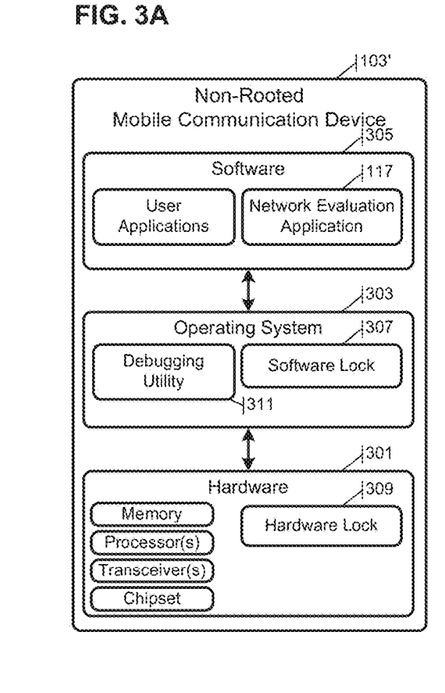
FIGS. 3A and 3B are block diagrams respectively showing configurations of a non-rooted mobile communication device and a rooted mobile communication device.

As illustratively shown in FIG. 3A, a non-rooted mobile communication device 103' includes hardware 301 such as memory, one or more processor(s), transceiver(s) configured for communication through networks (e.g., mobile wireless network 101), and a chipset. The memory of the mobile communication device 103' stores an operating system 303 which executes on the processor(s), and controls operation of the device 103'. The operating system 303 may be an Android or iOS operating system. The memory also stores various software programs 305, including user application software and the network evaluation application 117. The software programs 305 are executed on the processor(s), and interface with the device hardware 301 via the operating system 303.

In general, the operating system 303 on the non-rooted device 103' includes a software lock 307 that limits access by the software programs 305 to certain restricted resources of the mobile device 301', such as hardware resources or certain functions of the operating system 303. Hardware locks 309 may additionally serve to limit access to restricted resources. For example, the software and/or hardware locks 307, 309 may prevent software programs 305 from gaining access to critical resources such as operating system files and a system registry. The locks may also limit the type of access provided for the software programs 305 to the critical resources (e.g., read-only access may be provided, but not editing privileges). In addition, the software and/or hardware locks 307, 309 may prevent software programs 305 from gaining access to restricted hardware resources, such as certain information on or functions of a transceiver, a processor, or a chipset.

The software and/or hardware locks 307, 309 may be implemented by a manufacturer of the mobile communication device 103' and of the hardware 301, a developer of the operating system 303, and/or a network carrier or operator providing firmware for installation on the device 103'. For example, a software lock 307 may be implemented in firmware of a network carrier to restrict the device's ability to function on mobile wireless communication networks operated by competitors of the carrier.

The network evaluation application 117 is one of the software applications 305 installed on the mobile communication device 103, and is configured to execute on the processor(s) of the device 103'. However, operation of the network evaluation application 117 may be limited by the software and/or hardware locks 307, 309. In particular, the software and/or hardware locks 307, 309 may limit access by the application 117 to the processor(s), transceiver(s), and/or chipset, and may thereby limit the types of communication data accessible to the application 117 to monitor and evaluate network performance. For example, the locks 307, 309 may prevent the application 117 from gaining access to communication data relating to the physical layer (layer 1 of the open systems interconnection (OSI) model), data link layer (layer 2), and network layer (layer 3) that is otherwise available from the processor(s) and transceiver(s). As a result, the application 117 may in some situations be limited to only measuring and monitoring communication data available from higher layers, such as from the transport layer (layer 4), the session layer (layer 5), the presentation layer (layer 6), and the application layer (layer 7).

In some examples, the application 117 may nonetheless be operative to access detailed communication data obtained by the processor(s), transceiver(s), chipset, or other hardware 301 of the mobile communication device 103. In particular, the application 117 may communicate with a debugging utility 311 of the operating system 303 executing on the mobile communication device 103, and may obtain communication parameters and related information directly from the debugging utility 311.

The debugging utility 311 is a component of the operating system 303, and is provided by the operating system 303 for use by developers of user applications designed for execution on devices running the operating system 303. The debugging utility 311 is generally used while developing new user applications to debug the applications, and to obtain device contextual information relating to errors or failures experienced by user applications under development. The debugging utility 311 is generally not used directly by user applications on a routine basis, and is generally not accessed by applications as part of the applications' regular functioning. Nonetheless, the debugging utility 311 is accessible to non-root users of the mobile communication device, and can thus be accessed by the network evaluation application 117 executing on a non-rooted communication device 103'.

The debugging utility 311, for example the debugging utility of an Android operating system, provides information including communication parameters relating to communications of the mobile communication device 103 across the mobile wireless communication network 101. As such, in response to receiving a request from the network evaluation application 117 for communication parameter information, the debugging utility 311 provides to the application 117 information on communication links currently active on the mobile communication device 103, and/or on networks and equipment from which the device 103 receives signals. The debugging utility 311 may, in particular, provide information on communication parameters such as those described above in relation to FIGS. 2A-2H.

Figure 3B:
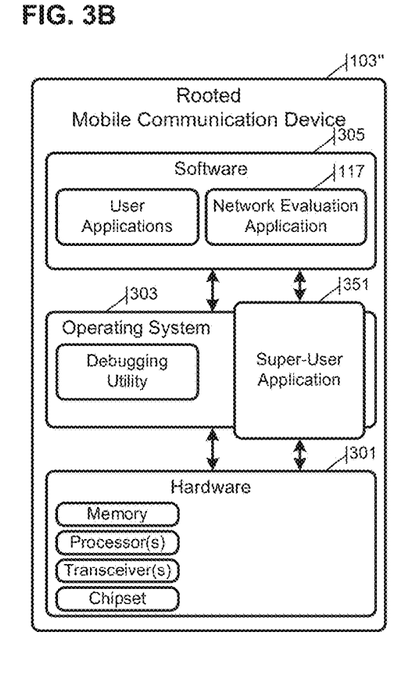

In other examples, the application 117 may be operative to access detailed communication data obtained by the processor(s), transceiver(s), chipset, or other hardware 301 of the mobile communication device 103. For example, if the application 117 is installed on a rooted device 103", a super-user application 351 executing on the device 103" may enable the application 117 to gain root user or super-user privileges and bypass any locks. The super-user application 351 is an application that provides unrestricted access to the device 103", including unrestricted access to the operating system 303 and hardware 305 of the device 103", such as the level of unrestricted access generally only provided to a root user or super-user (or administrator) of a device 103. The super-user application 351 enables a user and/or applications to gain unrestricted access to a device 103, and may further enable a user of the device 103" to identify applications executing on the device 103 that should be granted super-user access and applications that should not be granted super-user access.

FIG. 3B shows an illustrative block diagram of a mobile communication device 103" that has been rooted, and for which a user of the device has root or super-user privileges. In the device of FIG. 3B, the super-user application 351 provides software programs 305 installed on the rooted device 103" with full access to operating system and/or hardware resources of the device 103". In particular, the super-user application 351 may disable or bypass any software and hardware locks on the device 103" such that the network evaluation application 117 has access to and can communicate directly with the processor(s), transceiver(s), and chipset without being subject to any restrictions imposed by locks. As such, the network evaluation application 117 can access communication data of all seven layers of the OSI model via the super-user application 351, and can provide measurement and monitoring of communication data on the device 103" based on detailed communication parameter data obtained directly from the chipset and transceiver(s).

Specifically, in a rooted device 103", the network evaluation application 117 can access detailed communication parameter data by communicating directly with a transceiver and/or chipset via the super-user application 351. As such, the application 117 can issue a call to the transceiver or chipset to obtain the detailed communication parameter data from an interface of the transceiver or chipset. For example, in a device 103" having a Qualcomm transceiver and/or chipset, the application 117 can communicate directly with the Qualcomm transceiver and/or chipset to obtain detailed communication parameter data. In general, however, the application 117 may have to be specially re-configured to function on different rooted mobile communication devices 103" so as to properly interface with the hardware components and configurations of each device 103" since the hardware components and configurations of different devices 103" generally differ.

In general, the network evaluation application 117 is configured to operate both on rooted and on non-rooted mobile communication devices 103. In general, the application 117 is configured to monitor the same communication parameters and perform the same network performance measurements regardless of whether the device 103 executing the application 117 is rooted or non-rooted.

However, in some examples, the application 117 can be configured to adjust the range of communication parameters measured or monitored by the application 117 based on whether the device 103 executing the application 117 is rooted or non-rooted, and/or based on whether the application 117 has access to communications data relating to each parameter. The range of communication parameters may be automatically adjusted such that all available communication parameters are measured and monitored when the application 117 executes on a rooted device, and only those communication parameters available on a non-rooted device are measured and monitored when the application 117 executes on the non-rooted device. The range of communication parameters may further be adjusted based on user selection, for example by enabling a user of the application 117 to select those communication parameters that should be measured or monitored by the application 117. The network evaluation application 117 may thus be configured, following installation of the application 117 on a mobile communication device 103, to determine the types of communication data available to the application 117. The network evaluation application 117 may then be configured to adjust its operation based on the determined types of communication data available to the application 117. For example, the application 117 may notify the user of the types of communication data that are, or are not, available to the application, for example by hiding or graying-out communication data types that are not available. The application 117 may further reconfigure itself such that only those types of communication data that are available to the application 117 are stored in logs or otherwise monitored by the application 117.

In some situations, the network evaluation application 117 may further be configured to determine whether the mobile device 103 on which the application 117 is installed in a rooted device or a non-rooted device. Upon determining that the device is a rooted device, the network evaluation application 117 is operative to obtain network information directly from a transceiver and/or chipset of the device 103. In particular, the network evaluation application 117 may retrieve detailed communication data from the transceiver and/or chip set, including communication data relating to layers 1, 2, and/or 3 of the OSI model. If the application 117 determines that the device is a non-rooted device, the application is operative to revert to obtaining only those types of communication data that are available through the debugging utility 311 of the operating system 303. For example, the application 117 may measure a network transmission speed based on layer 4 information, such as based on a speed at which the application 117 receives (or is able to transmit) data across the network 101.

Figure 4:
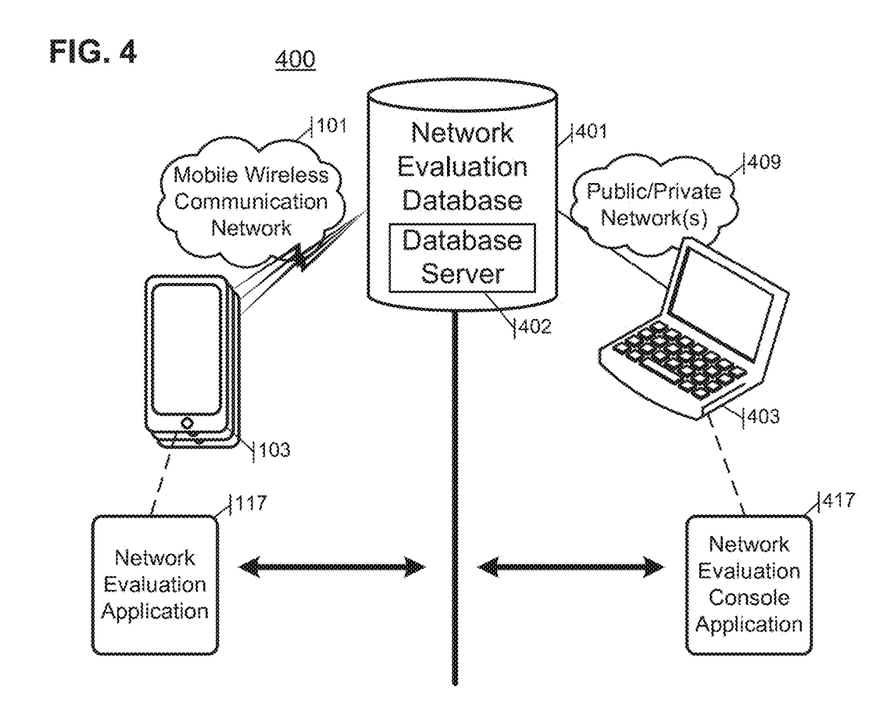
FIG. 4 is a block diagram of a system for assembling a database of network evaluation information, and for remotely interfacing with a network evaluation application executing on a mobile communication device.

FIG. 4 shows a block diagram of a system 400 for assembling a database 401 of network evaluation information. The information stored in the database 401 can be used in mobile wireless communication network design and optimization. The network evaluation information stored in the database 401 includes information on network performance measured at a variety of locations within the network coverage area, such as network performance information measured by network evaluation applications 117 executing on each of a plurality of mobile communication devices 103. Specifically, the database 401 stores a plurality of database entries each storing information for a different location.

In the system 400, the database 401 is communicatively coupled to mobile communication devices 103 for example via the mobile wireless communication network 101 and/or other networks (e.g., the backbone network 107 and one or more private networks and public networks such as the Internet). The database 401 can include, in addition to memory storage, a database server 402 that controls communications to/from the database 401, and that provides search, simulation, and other computational functions relating to data stored in the database 401. In some examples, the database server 402 may further execute web applications for providing database-related services to users through web browsers on client devices (e.g., smartphones, personal computers, or the like).

The database 401 is operative to receive measurements from the mobile communication devices 103. In particular, a mobile communication device 103 can execute a network evaluation application 117 through which a user of the mobile communication device 103 can measure network performance and provide communication parameters and measurement data to the database 401. The network evaluation application 117 may further provide the database 401 with location information obtained by the device 103 and indicative of a location at which the communication parameters and measurement data were obtained. The user can thus use the application 117 to create records corresponding to locations at which one or more measurements have been made, and store the records in the database 401. The user may further retrieve information on past measurements from the database 401 through the application 117.

The database 401 is further communicatively coupled to one or more console(s) 403 through which console users can interface with the database 401. The database 401 may be coupled to the console 403 through one or more private networks and/or public networks 409 such as the Internet. The console 403 may take the form of any device configured to execute a network evaluation console application 417, such as a laptop, desktop, or tablet computer, a server, or any other appropriate device. In some examples, the database server 402 can include a user interface and serve as a console.

As detailed above, the console application 417 can be used to receive and monitor measurements performed by mobile communication devices 103. The console application 417 can further be used to control mobile communication devices 103, for example to remotely cause a device 103 executing application 117 to initiate tests and/or measurements of the network 101. The console application 417 can further be used to trigger a camera on a mobile communication device 103 to take a picture to associate with a test or measurement of network communication and performance parameters.

In general, the console application 417 can display to a user of the console interface screens that are substantially similar to those described above in relation to application 117. Specifically, the console application 417 may prompt a user to identify or select of mobile communication device 103 and, in response to receiving a selection, may provide an interface screen substantially similar to the display screen of a network evaluation application 117 executing on the selected device 103. In particular, in response to the selection, the console application 417 may generate and transmit to the device 103 a request to receive network evaluation and monitoring data in real-time (e.g., real-time or near real-time). The request can be transmitted directly to the device 103, or transmitted to the database 401 that in turns forwards the request to the device 103. In response to receiving the request, the device 103 provides the network communication measurements and data to the console either directly, or via the database 401, to the console 403.

Figure 5:
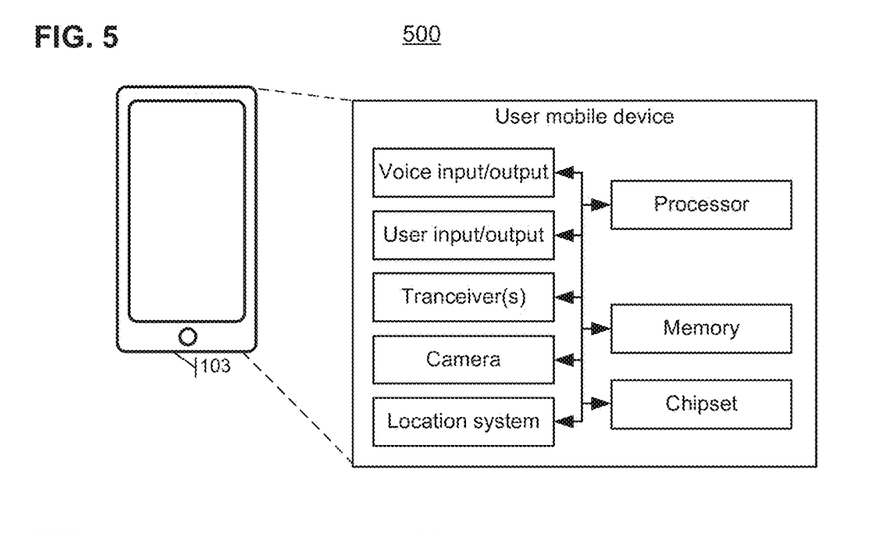
FIGS. 5, 6, and 7 are high-level functional block diagrams of an exemplary user mobile communication device, an exemplary database and database server, and an exemplary console, respectively, as may be involved in the assembly and use of the database of network evaluation information.
Figure 6:
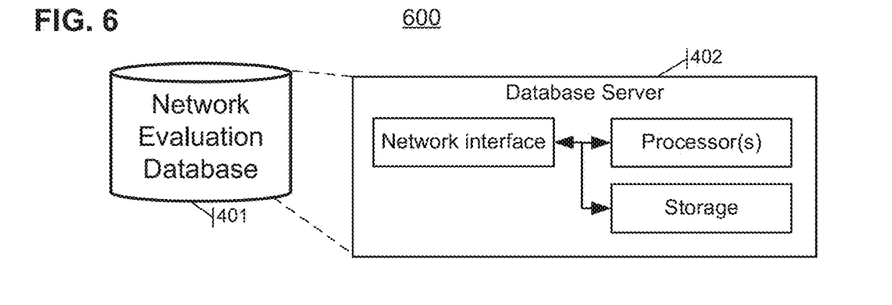
Figure 7:
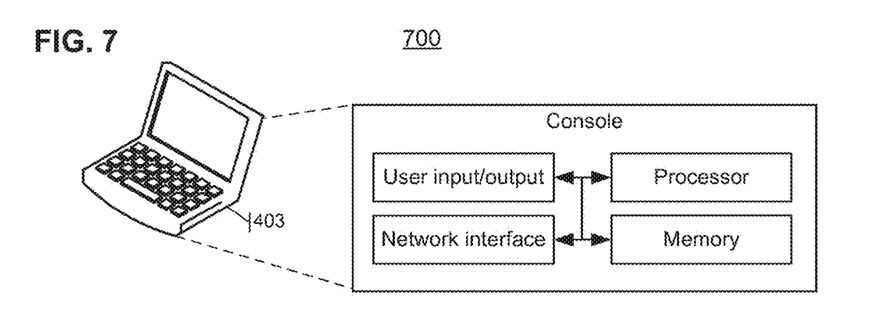

FIGS. 6, 7, and 8 are block diagrams of devices used in the monitoring and evaluation of mobile wireless communication services, and in the assembly of the network evaluation database 401 as described above. Specifically, FIG. 5 is an illustrative block diagram 500 of a user mobile communication device 103 such as a smartphone; FIG. 6 is an illustrative block diagram 600 of a network evaluation database 401 including a database server 402; and FIG. 7 is an illustrative block diagram 700 of a console 403.

As shown in the diagram 500 of FIG. 5, a user mobile communication device 103 can include a voice input/output interface including a microphone and a speaker; a user input/output interface including one or more of a keypad, a display, and a touchscreen; one or more transceiver(s) configured for communication across a mobile wireless communication network such as network 101, and optionally additionally configured for communication across other networks such as WiFi wireless networks; a camera for capturing still or video images; a location determining system to determine a location of the mobile communication device based on a global positioning system (GPS) and signals received from GPS satellites, or on triangulation from base stations having known locations; and a chipset for managing data flow and communications between the processor, memory and other components of the device 103. Operation of the user mobile communication device 103 is controlled by one or more processor(s) coupled to a non-transitory memory storing user data and machine readable instructions for controlling the device.

The database shown at 600 has a non-transitory memory or storage, such as a hard disk drive, for storing the database entries. The database can further include a database server including one or more processor(s) for controlling operation of the database and providing value-added services to users of the database. The database also includes a network communication interface for communicating across one or more different network types, including but not limited to mobile wireless communication networks, local area or wide area networks (LANs/WANs), or the like.

Finally, the console 403 may take the form of a personal computer (as shown in FIG. 7), a network terminal, or the like. The console includes a user input/output interface for presenting information to a user, and receiving selections and commands from the user. The user input/output interface can take the form of a display, mouse or touchpad, touchscreen, and/or keyboard, for example. The console additionally includes a network interface for communicating across one or more different network types, a non-volatile memory storing user data and machine readable instructions, and a processor operative to execute the instructions and control the operation of the console.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for evaluating performance of a mobile wireless communication network using a mobile communication device that is remote from a computer, the method comprising:
    communicating, from the remote computer through the mobile wireless communication network to the mobile communication device, an instruction to perform network services measurement;
    in response to receiving the instruction, executing in the mobile communication device a network evaluation application, wherein the network evaluation application includes:
        measuring a quality of communication services provided by the mobile wireless communication network, wherein the measuring includes retrieving, by the network evaluation application from a debugging utility of an operating system of the mobile communication device, communication parameters relating to communications of the mobile communication device across the mobile wireless communication network and transmitting at least one of the communication parameters to the remote computer, in real time, as they are retrieved from the debugging utility;
        calculating, by the network evaluation application and based on the retrieved communication parameters and test parameters defined by a user, at least one of a throughput, a delay, a latency, or a combination thereof of communication packets transmitted or received by the network evaluation application across the mobile wireless communication network and, associated with the calculating, transmitting through the mobile wireless communication network from the mobile communication device to the remote computer, in real time as they are calculated by the network evaluation application, the calculated throughput, delay, or latency, or combination or sub-combination thereof; and
    displaying, on the display screen of the remote computer, at least one of the communication parameters transmitted in real time by the network evaluation application as retrieved from the debugging utility and the calculated throughput, delay, or latency, or combination or sub-combination thereof, transmitted to the remote computer real time as it is calculated by the network evaluation application.

2. The method of claim 1, wherein the mobile communication device is a non-rooted mobile communication device, and the debugging utility of the operating system is accessible to non-root users of the mobile communication device.

3. The method of claim 1, wherein the debugging utility of the operating system of the mobile communication device is a utility configured for use by developers of user applications executing on the operating system.

4. The method of claim 1, wherein the debugging utility of the operating system of the mobile communication device is a utility not configured for routine use by user applications executing on the mobile communication device.

5. The method of claim 1, wherein the instruction sent by the remote computer includes the parameters,
    wherein the test parameters sent by the remote computer comprise at least one from among parameters for establishing a voice call, parameters for performing a file transfer protocol (FTP) transfer, parameters for performing a ping operation, or parameters for transmitting a hypertext markup language (HTML) request, or any combination thereof, and wherein measuring the quality of communication services provided by the mobile wireless communication network is based at least in part on the test parameters sent by the remote computer.

6. The method of claim 1, wherein the mobile communication device is a smartphone running an Android operating system.

7. A console device comprising:
    a processor;
    a display screen;
    a transceiver configured for communication across a mobile wireless communication network;
    a memory storing computer readable instructions that, when executed on the processor, cause the processor to perform functions including functions to:
        send to a mobile communication device, through the mobile wireless communication network, an instruction to measure a quality of communication services provided to the mobile communication device by the mobile wireless communication network, wherein the instruction is configured to cause the mobile communication device to execute a network evaluation application operative to measure a quality of communication services provided by the mobile wireless communication network, by causing the mobile communication device to:

retrieve, by the network evaluation application from a debugging utility of an operating system of the mobile communication device, communication parameters relating to communications of the mobile communication device across the mobile wireless communication network and to transmit at least one of the communication parameters to the console, in real time as they are retrieved from the debugging utility;

calculate, by the network evaluation application and based on the retrieved communication parameters and test parameters defined by a user, at least one of a throughput, a delay, a latency, or a combination thereof of communication packets transmitted or received by the network evaluation application across the mobile wireless communication network and, associated with the calculating, to transmit through the mobile wireless communication network to the console, in real time they are calculated by the network evaluation application, the calculated throughput, delay, or latency, or combination or sub-combination thereof; and display, on the display screen, at least one of the communication parameters transmitted in real time by the network evaluation application as retrieved from the debugging utility and the calculated throughput, delay, latency, or combination or sub-combination thereof of communication packets across the mobile wireless communication network, transmitted in real time as they are calculated by the network evaluation application.

8. The console device of claim 7, wherein the instruction to measure the quality of communication services provided to the mobile communication device by the mobile wireless communication network is configured for a non-rooted mobile communication device, in which the debugging utility of the operating system is accessible to non-root users of the mobile communication device.

9. The console device of claim 7, wherein the instruction to measure the quality of communication services provided to the mobile communication device by the mobile wireless communication network is configured for the debugging utility of the operating system of the mobile communication device being a utility configured for use by developers of user applications executing on the operating system.

10. The console device of claim 7, wherein the instruction to measure the quality of communication services provided to the mobile communication device by the mobile wireless communication network is configured for the debugging utility of the operating system of the mobile communication device being not configured for routine use by user applications executing on the mobile communication device.

11. The console device of claim 7, wherein the functions further include functions to send to the mobile communication device, in association with the instruction, test parameters for the mobile communication device to use in said measuring the quality of communication services provided by the mobile wireless communication network, and wherein the test parameters comprise parameters for establishing a voice call, parameters for performing a file transfer protocol (FTP) transfer, parameters for performing a ping operation, or parameters for transmitting a hypertext markup language (HTML) request, or any combination thereof.

12. The console device of claim 7, wherein the computer readable instructions further cause the processor to perform a function to: display on the display screen a map having overlaid thereon the communication parameters or the calculated throughput, delay, latency, or the combination or sub-combination thereof obtained by a plurality of the network evaluation applications, executed by a respective plurality of mobile communication devices at a plurality of different locations.

13. The device of claim 7, wherein the instruction to measure the quality of communication services provided to the mobile communication device by the mobile wireless communication network is configured for a mobile communication device that is a smartphone running an Android operating system.

14. The method of claim 1, wherein the retrieving the communication parameters includes retrieving at least one of a cell ID associated with a base station or a cell tower, a location area code, a primary scrambling code, a signal strength indicator, or a combination thereof.

15. The method of claim 14, wherein the retrieving the communication parameters further includes retrieving at least one of a mobile country code, a physical layer cell identity, a reference signal received power, a reference signal received quality, or a combination thereof.

16. The method of claim 1, further comprising:

communicating, from the computer through the mobile wireless communication network to the mobile communication device, an instruction to trigger a camera on the mobile communication device to take a picture to associate with measuring the quality of services provided to the mobile communication device by the mobile wireless communication network.

17. The method of claim 1, wherein executing the network evaluation program further includes:

detecting an active mode/idle mode state of the mobile communication device;

while in the idle mode, causing the mobile communication device to obtain communication parameters for each among multiple technologies, wherein the multiple technologies are each selected from the group consisting of wideband code division multiple access (WCDMA), long term evolution (LTE), universal mobile telecommunication system (UMTS), general packet radio service (GPRS), global system for mobile (GSM) communications, and enhanced voice-data optimized (EVDO) communications; and while in the active mode, causing the mobile communication device to obtain communication parameters for one among the multiple technologies.

18. The console device of claim 7, wherein the instructions further include instructions that, when executed by the processor, cause the processor to communicate to the mobile communication device, through the mobile wireless communication network, an instruction to trigger a camera on the mobile communication device to take a picture to associate with measuring the quality of services provided to the mobile communication device by the mobile wireless communication network.

19. The method of claim 1, further comprising:

presenting, on the display of the remote computer, an interface that provides for a user of the remote to select among two or more mobile communication devices configured with the network evaluation application, and for the user to select test parameters, and provides the user a test start option;

in response to the user selecting the test start option, communicating the selected test parameters to a selected mobile communication device, and enabling the selected mobile communication device to perform tests according to the selected test parameters.

20. The method of claim 1, wherein the network evaluation application further includes:
prompting a user of the mobile communication device to select another mobile communication device to run the network evaluation application.

21. The method of claim 1, wherein executing the network evaluation application includes adjusting a range of communication parameters that the network evaluation application measures based on whether the mobile communication device is rooted or non-rooted.

22. The method of claim 21, wherein adjusting a range of communication parameters includes automatically adjusting the range of communication parameters in a manner such that all available communication parameters are measured when the network evaluation application executes on a rooted device, and only those communication parameters available on a non-rooted device are measured when the network evaluation application executes on the non-rooted device.

* * * * *